Feb. 9, 1971  J. D. GOODLAXSON  3,562,735
ROTATION SENSING DEVICE
Filed Dec. 20, 1967

INVENTOR.
JOHN D. GOODLAXSON
BY
William J. Landwier
AGENT

United States Patent Office 3,562,735
Patented Feb. 9, 1971

3,562,735
ROTATION SENSING DEVICE
John D. Goodlaxson, Colfax, Iowa, assignor to The Maytag Company, Newton, Iowa, a corporation of Delaware
Int. Cl. G08b *21/00;* H01h *9/00*
Filed Dec. 20, 1967, Ser. No. 692,009
U.S. Cl. 340—271   11 Claims

ABSTRACT OF THE DISCLOSURE

A rotation sensing device including a housing attachable to a rotatable member and containing an actuation member in the form of a magnet movable between first and second positions with a change in the rotation of the rotatable member. Means, in the form of a reed switch positioned adjacent to the housing, is operable for providing a signal indicating rotation of the rotatable member.

BACKGROUND OF THE INVENTION

Field of the invention

This invention relates to motion sensors and more particularly to means for sensing and indicating rotation of a rotatable member.

Description of the prior art

There are numerous machines and devices having a rotatable member wherein it is essential or at least desirable to sense and indicate rotation of the rotatable member. Examples of such rotatable members would include the drum of a centrifugal extractor or the armature of a motor or motor-driven device. Prior art patents show devices for sensing rotation using mercury switches or using a device in which a body of mercury is rotated and assumes the characteristic parabolic shape for completing a circuit between a pair of contact members. These sensors, however, as is typical of similar rotary motion sensor devices in prior art patents, require use of a slip ring arrangement or other connection between the rotary member and the associated indicator means.

SUMMARY OF THE INVENTION

It is therefore an object of this invention to provide an improved rotation sensing device for sensing and indicating rotary motion.

It is a further object of the instant invention to provide an improved rotary motion sensing device having rotary and stationary components wherein contact between the rotary and stationary components is eliminated.

It is a further object of the instant invention to provide an improved rotary motion sensing device using magnetic actuation means for indicating rotation of the rotary member.

The motion sensing device of the instant invention achieves the above objectives in a device having actuation means retained within a rotatable chamber and movable between first and second positions upon rotation of the rotatable member. Means responsive to movement of the actuation means between these positions is juxtaposed to but spaced from the rotatable member for providing a signal indicating a rotation condition of the rotatable member.

Operation of the device and further objects and advantages thereof will become evident as the description proceeds and from an examination of the accompanying page of drawings which illustrate a preferred embodiment of the invention and in which similar numerals refer to similar parts throughout the two views.

DESCRIPTION OF THE PREFERRED EMBODIMENT

Figure 1:
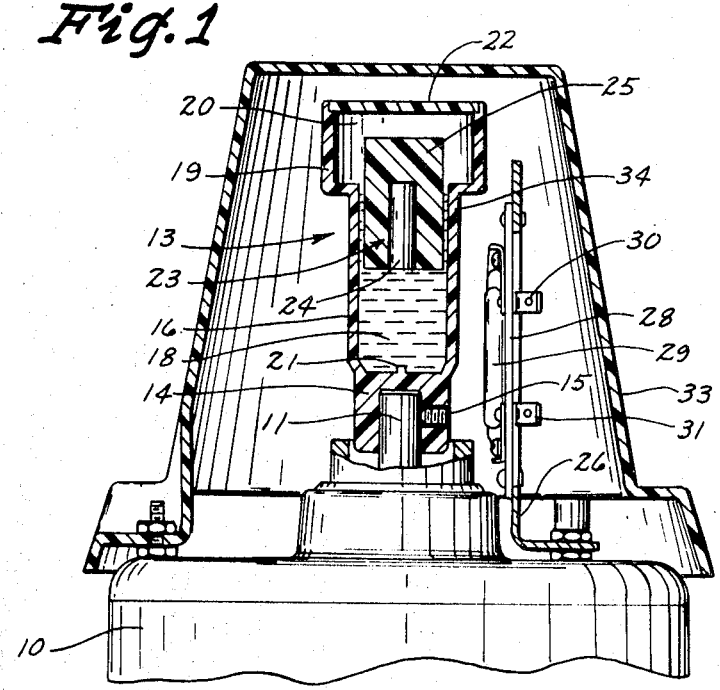
FIG. 1 shows the instant invention as adapted for sensing rotation of a motor shaft wherein the rotatable shaft is shown at rest.

Referring to FIG. 1, there is shown the rotation sensing device of the instant invention as adapted to an electric motor 10 for sensing rotation of the armature (not shown) thereof. The armature and the shaft extension 11 connected to and rotatable therewith is shown in the rest or static condition.

The rotation sensing device includes a housing 13 comprising a hub 14 attachable to the shaft extension 11 by a set screw 15, a lower portion 16 forming a lower reservoir 18 for a body of fluid with the shaft 11 at rest, and an upper radially enlarged portion 19 that is closed by a cap member 22 to serve as an upper reservoir 20 for the fluid with the shaft 11 rotating as will be more fully shown hereinafter. A projection 21 extends upwardly at the center of the bottom wall of the housing 13.

Disposed within the chamber formed by the lower and upper portions 16 and 19 of the housing member 13 is an actuation means 23 axially movable within the chamber as the state or speed of rotation of the motor shaft 11 changes. The actuation means 23 includes, for example, a magnet 24 having a substantially cylindrical form and having a north pole disposed at its upper end and a south pole at its lower end. Other actuation means could include a plurality of magnetic particles supportable and movable in a manner substantially similar to magnet 24. The magnet 24 in the instant embodiment is at least partially encased by a low density material such as a styrene plastic foam float member 25 to facilitate the floating of the actuation means 23 by the fluid contained within the chamber.

The chamber is filled with a fluid to a predetermined level with the shaft 11 and housing 13 at rest for effectively positioning the actuation means 23 at a first position within the chamber as in FIG. 1. The fluid in this embodiment is in the form of a liquid comprising a mixture of ethylene glycol and water and thus the device is operable in a freezing environment. Other fluids may be adapted for use in this motion sensing device.

Located adjacent the rotatable shaft 11 and housing 13, but isolated therefrom, is a mounting bracket 26 attached to the upper end of the motor 10 and to which a terminal board 28 is attached for supporting a reed switch 29 and a pair of terminals 30, 31 electrically connected to opposite sides of the reed switch 29. The conventional reed switch 29 includes a pair of contacts carried on elongated leaf members that are operable to a closed position, for example, in the presence of a magnetic field passing substantially longitudinally through the leaf members and the adjacent contacts.

With the magnet 24 at the elevated position, as in FIG. 1, the magnetic field is located at a position upwardly disposed from that necessary to actuate the reed switch 29. Therefore, use of a reed switch 29 having normally open contacts will maintain the circuit open when the motor 10 is at rest and the actuation means 23 positioned as shown in FIG. 1.

A cover member 33 effectively encloses the rotary sensing device and serves as a water shield for the upper portion of the motor 10.

Figure 2:
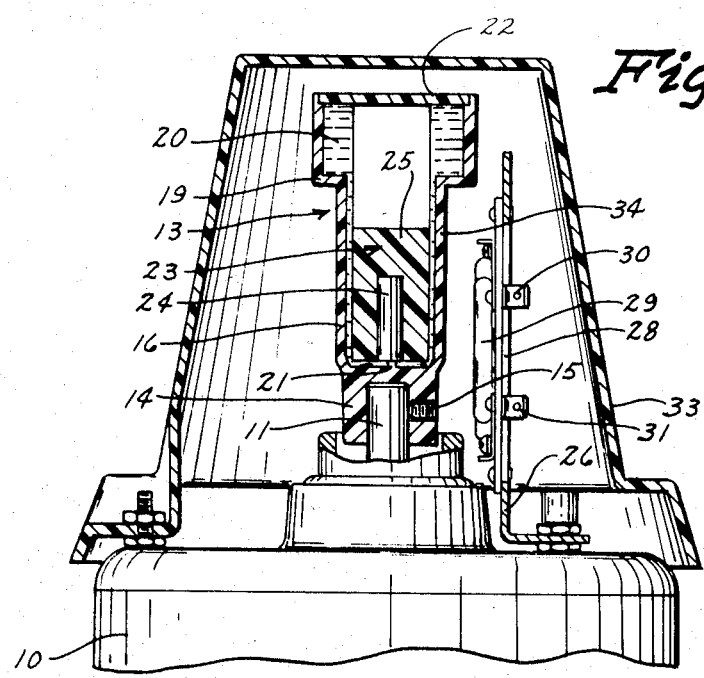
FIG. 2 is similar to the view shown in FIG. 1 and shows the relationship of the parts when the motor shaft is rotating.

Operation of the device is more clearly seen by comparing the position of the fluid and actuation means 23 as shown in FIG. 1 with the motor 10 at rest, and in FIG. 2 with the motor 10 rotating above a predetermined speed. As previously indicated, the actuation means 23, with the motor shaft 11 at rest, is maintained at an elevated position, or floating in an upper level of the fluid. This elevated position maintains the reed switch 29 in its normally open condition.

Upon rotation of the motor shaft 11 and of the housing 13 attached thereto, the centrifugal force acting on the fluid tends to move it into the characteristic parabolic distribution so that the majority of the fluid is retained in reservoir 20 formed by the upper enlarged portion 19 of the housing 13. The movement of the fluid allows the actuation means 23 to move downwardly to a lower position as shown in FIG. 2. Downward movement of the actuation means 23 will be limited by the upward projection 21 dispposed at the bottom of the housing 13. At this position, the magnet 24 will be located so that the magnetic field created thereby is effective for passing sufficient lines of magnetic force substantially longitudinally through the reed switch 29 to effect actuation thereof. This actuation of the reed switch 29 will close the contacts and facilitate completion of a circuit, effectively providing a signal for initiating operation of exteriorly disposed devices or indicating components.

Upon interruption of the rotation of the motor 10, the speed of the shaft 11 decreases and the centrifugal force acting on the fluid decreases so that the fluid tends to flow downwardly from the upwardly disposed reservoir 20 into the lower reservoir 18. The actuation means 23 then returns to the upper position as shown in FIG. 1.

It may be seen from FIGS. 1 and 2 that the outside diameter of the actuation means 23 is less than that of the inside diameter of the housing 13 so that the fluid may flow therebetween as the fluid tends to move between the upper and lower reservoirs upon a change in the rotation of the motor shaft 11. The specific spacing is one factor in determining the operational time delay. This passageway between the actuation means 23 and housing wall 34 may be varied in dimension, or the viscosity of the fluid may be altered, to provide a greater or lesser time delay in the flow of the fluid between the upper and lower reservoirs 20 and 16 and in the resulting operation of the reed switch 29.

As previously indicated, the reed switch 29 shown in the drawings is of the normally open type which upon the presence of a magnetic circuit is operated to the closed position. It is also recognized that a normally closed switch may be used at the location as shown in the drawings and then be operable to an open position for de-energizing a circuit upon sensing rotation of a rotatable member. Likewise, the position of the reed switch may be altered so that a similar change in the relative opening and closing of the reed switch may be accomplished while still using a normally open reed switch.

A further variation of operational characteristics of the device may be achieved by using actuation means having the shape of an annular torus that is supportable on the fluid level at rest and then rises with the upper level of the parabolic fluid body for actuating a switch.

Instead of providing a reed switch that is responsive to the magnet, an alternate signal generating means could include means magnetically responsive to movement of the actuation means and connected to a system including mechanical linkages for effecting a visual indication of rotation.

The drawings in this application show a motor mounted on a substantially vertical axis. It is recognized, however, that this device is also operable with the rotating member disposed at an axis other than vertical. This device is operable at an angle with the vertical as long as a component of force is operable for returning the actuation means to the position normally occupied with the rotating member at rest.

It is therefore seen from the foregoing disclosure that the instant invention is operable for providing a rotation sensing device utilizing a unique mode of operation wherein a first portion of the device may be attached to the rotating member for rotation therewith whereas a second non-rotatable portion may be mounted juxtaposed to but isolated from the rotating member. This unique system eliminates the need for contact between component portions.

In the drawings and specification, there has been set forth a preferred embodiment of the invention and, although specific terms are employed, these are used in a generic and descriptive sense only and not for purposes of limitation.

I claim:

1. A device for sensing rotation of a rotatable member, comprising: housing means attached to said rotatable member for movement therewith and defining a chamber for statically and dynamically retaining fluid; a body of fluid within said chamber partially filling said chamber to a predetermined static level; actuation means movable between first and second positions within said chamber, said fluid being movable outwardly to a dynamic posture responsive to rotation of said housing means, said actuation means being in turn movable axially from said first to said second position responsive to said outward fluid movement whereby there is relative movement between said actuation means and a portion of said fluid; and means in spaced juxtaposition to said housing means magnetically responsive to movement of said actuation means for operating from a first condition to a second condition upon a predetermined change in the condition of rotation of said rotatable member.

2. A rotation sensing device as defined in claim 1 wherein said fluid moves relative to said actuation means and is responsive to centrifugal force for effecting movement of said actuation means from said first to said second position.

3. A rotation sensing device as defined in claim 2 wherein the movement of fluid relative to said actuation means is restricted for effecting a time delay in the movement of said actuation means between said first and second positions.

4. A rotation sensing device as defined in claim 1 wherein said actuation means includes a magnetic portion and wherein said magnetically responsive means includes a reed switch operable between non-conductive and conductive conditions.

5. A device for sensing rotation of a rotatable member comprising: housing means attached to said rotatable member for movement therewith and defining a chamber for statically and dynamically retaining fluid; a body of fluid within said chamber partially filling said chamber to a predetermined static level; movable actuation means within said chamber supported at a first position with said rotatable member at rest and movable to a second position with said rotatable member rotating above a predetermined speed, said fluid being movable relative to said housing means and said actuation means for effecting movement of said actuation means to said second position responsive to rotation of said rotatable member; and means in spaced juxtaposition to said housing means magnetically responsive to movement of said actuation means from said first position to said second position for operating from a first condition to a second condition upon rotation of said rotatable member above said predetermined speed.

6. A rotation sensing device as defined in claim 5 wherein said actuation means includes a magnet and means for supporting said magnet at said first position and wherein said supporting means is in the form of a low density casing for floatingly supporting said magnet in said body of fluid at said first position.

7. A device for sensing rotation of a rotatable member comprising: housing means attached to said rotatable member for rotation therewith and defining a chamber for statically and dynamically retaining fluids and including a generally cylindrical portion; a body of fluid within said chamber partially filling said chamber to a predetermined static level; magnetic actuation means supported at a first position within said cylindrical portion with said rotatable member at rest and movable to a second position within said cylindrical portion with said rotatable member rotating above a predetermined speed, said fluid being movable relative to said housing means and said actuation means responsive to rotation of said rotatable member to effect movement of said actuation means to said second position, said actuation means being operable within said cylindrical portion for restricting the movement of fluid to effect a time delay in the movement of said actuation means; and means in spaced juxtaposition to said housing means and magnetically responsive to movement of said magnetic actuation means from said first position to said second position for operating from a first condition to a second condition.

8. A rotation sensing device as defined in claim 7 wherein said magnetically responsive means includes a reed switch operable between non-conductive and conductive conditions.

9. A rotation sensing device as defined in claim 7 and further including supporting means operable for floatingly supporting said magnetic actuation means in at least one of said two positions.

10. A rotation sensing device as defined in claim 7 wherein said body of fluid is responsive to rotation of said rotatable member and flowable from a first portion of said chamber to a second enlarged portion of said chamber to effect movement of said actuation means from said first position to said second position.

11. A device for sensing rotation of a rotatable member, comprising: housing means attached to said rotatable member for rotation therewith and defining a chamber including a first portion and an enlarged portion; a body of fluid within said first portion at least partially filling said first portion to a predetermined static level; magnetic actuation means within said chamber and movable responsive to movement of said fluid, a major portion of said body of fluid being movable relative to said activation means from said first portion of said chamber to the enlarged portion of said chamber responsive to centrifugal force acting on said body of fluid to effectively relocate said magnetic actuation means; and means magnetically responsive to said relocation of the actuation means for operating from a first electrical condition to a second electrical condition.

References Cited

UNITED STATES PATENTS

| | | | |
|---|---|---|---|
| 1,938,679 | 12/1933 | Anderson | 340—263 |
| 2,590,680 | 3/1952 | Campbell | 200—84.3X |
| 2,524,261 | 10/1950 | Kaminky | 335—205X |
| 2,616,003 | 10/1952 | MacDonald | 335—205X |
| 2,938,091 | 5/1960 | Canfield | 340—263UX |
| 3,264,560 | 8/1966 | Cheney | 340—271X |

ALVIN H. WARING, Primary Examiner

P. PALAN, Assistant Examiner

U.S. Cl. X.R.

340—263; 200—84; 335—205